(12) United States Patent
Pustovalov et al.

(10) Patent No.: US 9,154,264 B2
(45) Date of Patent: Oct. 6, 2015

(54) DEVICE, SYSTEM AND METHOD OF WIRELESS COMMUNICATION BETWEEN CIRCUITS

(75) Inventors: Evgeny Vasilievich Pustovalov, Saint-Petersburg (RU); Andrey Mihailovich Turlikov, Saint-Petersburg (RU)

(73) Assignee: INTEL CORPORATION, Santa Clara, CA (US)

( * ) Notice: Subject to any disclaimer, the term of this patent is extended or adjusted under 35 U.S.C. 154(b) by 213 days.

(21) Appl. No.: 13/976,040

(22) PCT Filed: Mar. 30, 2011

(86) PCT No.: PCT/RU2011/000202
§ 371 (c)(1),
(2), (4) Date: Jun. 26, 2013

(87) PCT Pub. No.: WO2012/134320
PCT Pub. Date: Oct. 4, 2012

(65) Prior Publication Data
US 2013/0272342 A1 Oct. 17, 2013

(51) Int. Cl.
*H04L 1/08* (2006.01)
*H04L 1/18* (2006.01)
*H04L 25/49* (2006.01)

(52) U.S. Cl.
CPC ............... *H04L 1/08* (2013.01); *H04L 1/1845* (2013.01); *H04L 25/4902* (2013.01)

(58) Field of Classification Search
CPC ... H04L 1/1822; H04L 1/1819; H04L 5/0055; H04L 1/1896; H04L 1/1874; H04L 1/1835; H04L 1/189; H04L 1/08
See application file for complete search history.

(56) References Cited

U.S. PATENT DOCUMENTS

2004/0248579 A1\* 12/2004 Fukui et al. ................... 455/450

FOREIGN PATENT DOCUMENTS

| CN | 1638322 | 7/2005 |
|---|---|---|
| CN | 1975758 | 6/2007 |
| CN | 101729206 | 6/2010 |
| EP | 1515473 A2 | 3/2005 |
| JP | 2001306436 | 11/2001 |
| JP | 2007522773 | 8/2007 |
| JP | 2009164927 | 7/2009 |
| WO | 2004021658 A1 | 3/2004 |

OTHER PUBLICATIONS

International Search Report for PCT/RU2011/000202, mailed on Dec. 15, 2011.

(Continued)

*Primary Examiner* — Curtis Odom
(74) *Attorney, Agent, or Firm* — Shichrur & Co.

(57) ABSTRACT

Some demonstrative embodiments include devices, systems and/or methods of wireless communication between circuits. For example, an integrated chip may include a plurality of wirelessly interconnected electronic circuits to communicate wireless pulse-position-modulation (PPM) signals over a common wireless communication channel during a predefined sequence of time slots; and a monitor circuit connected to the plurality of electronic circuits via a plurality of wired feedback links, the monitor circuit is to monitor the wireless channel, and to feedback via the feedback links a sequence of event feedbacks corresponding to the sequence of time slots.

18 Claims, 4 Drawing Sheets

(56) References Cited

OTHER PUBLICATIONS

IEEE Communications Letters. vol. 14. No. 9. Sep. 2010 Hybrid ARQ for FSO Communications Through Turbulent Atmosphere—Kamran Kiasalch, Senior Member, IEEE; 3 pages.

ISSSTA2004, Sydney, Australia, Aug. 30-Sep. 2, 2004 A CMOS UWB Transmitter for Intra/Inter-chip Wireless Communication; Pran Kanai Saha, Nobuo Sasaki and Takamaro Kikkawa; Research Center for Nanodevices and Systems, Hiroshima University, Japan; 5 pages.

SICTA Modifications with Single Memory Location and Resistant to Cancellation Errors—Sergey Andreev, Eugeny Pustovalov, and Andrey Turlikov; St. Petersburg State University of Aerospace Instrumentation, Russia; 12 pages.

G.T. Peeters et al. / Performance Evaluation 64 (2007) 1041-1052; Published by Elsevier B.V. A multiaccess tree algorithm with free access, interference cancellation and single signal memory requirements G.T. Peeters, B. Van Houdt, C. Blondia; University of Antwerp, Department of Mathematics and Computer Science, Performance Analysis of Telecommunication Systems Research Group—IBBT, Middelheimlaan 1, B-2020 Antwerp, Belgium; 12 pages.

IEEE Transactions on Information Theory (Revised) High-Throughput Random Access Using Successive Interference Cancellation in a Tree Algorithm Yingqun Yu and Georgios B. Giannakis Nov. 4, 2006; 29 pages.

IEEE Transactions on Information Theory, vol. IT-25, No. 5, Sep. 1979 Tree Algorithms for Packet Broadcast Channels; John I. Capetanakis; 11 pages.

Dimitri P. Bertsekas and Robert G. Gallager; "Data Networks" (2nd edition) Prentice Hall, 1992, ISBN 0132009161, Chapter 4—Multiaccess Communication, Sec. 4.3—Splitting Algorithms, 4.3.1 Tree Algorithms; pp. 290-293.

Office Action for Chinese Patent Application No. 201210164350.2, mailed on Jul. 3, 2014, 48 pages, including 32 pages of English translation.

International Preliminary Report on Patentability for PCT Application No. PCT/RU2011/000202, mailed on Oct. 10, 2013, 8 pages.

Office Action for Chinese Patent Application No. 201210164350.2, mailed on Mar. 18, 2015, 26 pages, including 18 pages of English translation.

* cited by examiner

DEVICE, SYSTEM AND METHOD OF WIRELESS COMMUNICATION BETWEEN CIRCUITS

CROSS REFERENCE

This application is a National Phase Application of PCT International Application No. PCT/RU2011/000202, International Filing Date Mar. 30, 2011, the entire disclosure of which is incorporated herein by reference.

BACKGROUND

Various devices may include a plurality of circuits, which may have to communicate with one another.

Using wired interconnections for communication between the circuits may cause parasitic resistance, capacitance and/or inductance, which may result in speed restrictions and/or may prevent efficient downscaling of semiconductor device dimensions.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
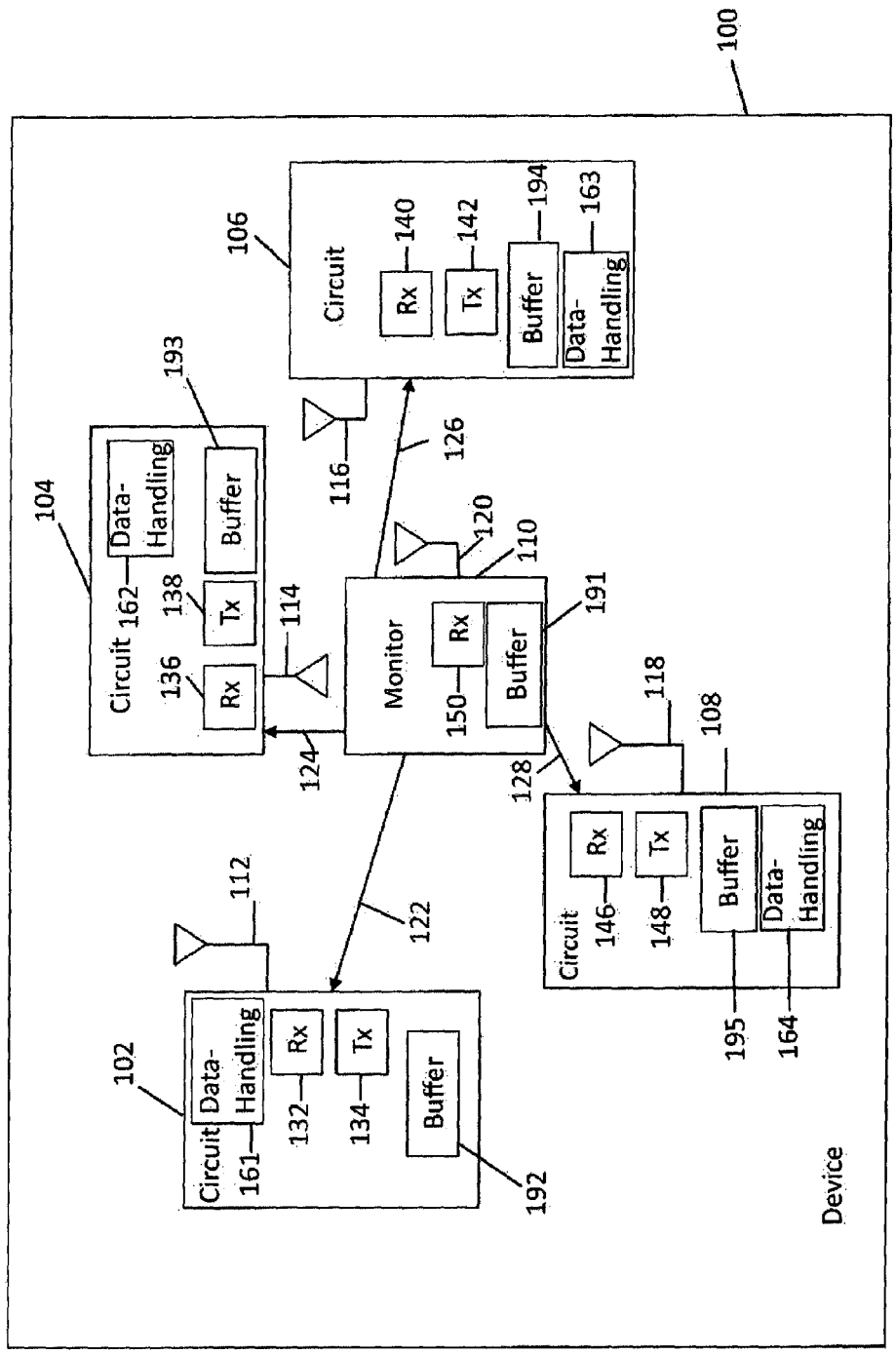
FIG. 1 is a schematic block diagram illustration of a device, in accordance with some demonstrative embodiments of the invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with suitable Wireless Chip Area Networks (WCAN) standards and/or protocols and/or future versions and/or derivatives thereof, devices and/or networks operating in accordance with existing IEEE 802.11 (*IEEE 802.11-2007: Standard for Information technology—Telecommunications and information exchange between systems—Local and metropolitan area networks—Specific requirements, Part 11: Wireless LAN Medium Access Control (MAC) and Physical Layer (PH)) Specifications—June* 2007) standards ("the 802.11 standards"), 802.16 (*IEEE-Std* 802.16, 2004 *Edition, Air Interface for Fixed Broadband Wireless Access Systems*), 802.16d, 802.16e (*IEEE-Std* 802.16e, 2005 *Edition, Physical and Medium Access Control Layers for Combined Fixed and Mobile Operation in Licensed Bands*) standards ("the 802.16 standards") and/or future versions and/or derivatives thereof, devices and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Reference is now made to FIG. 1, which schematically illustrates a block diagram of a device 100 in accordance with some demonstrative embodiments of the invention.

In some demonstrative embodiments, device 100 may include or may be included as part of, for example, an electronic device, a computing device, a communication device, a wireless communication device, an electronic device and/or any other suitable device. For example, device 100 may include or may be included as part of a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a handset, a PCS device, a PDA device which incorporates a wireless communication device, a mobile or portable GPS device, a DVB device, a relatively small computing device, a non-desktop computer, a "Carry Small Live Large" (CSLL) device?, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, an AP, a base station, or the like.

In some demonstrative embodiments, device 100 may include a plurality of electronic circuits, e.g., circuits 102, 104, 106 and/or 108, capable of communicating with one another over at last one common wireless communication channel, e.g., as described in detail below.

In some demonstrative embodiments, electronic circuits 102, 104, 106 and/or 108 may form a suitable wireless communication network, for example, a WCAN, or any other suitable wireless communications network. For example, the WCAN may include a plurality of wirelessly interconnected electronic circuits, e.g., circuits 102, 104, 106 and/or 108, wherein each electronic circuit includes a transceiver (radio), e.g., integrated as part of the electronic circuit, to communicate wireless signals over a common wireless communication channel, and a suitable data handling module associated with the transceiver to provide data to be transmitted by the transceiver and/or to handle data received via the transceiver.

In some demonstrative embodiments, circuits 102, 104, 106 and/or 108 may include or may be part of any suitable circuitry, logic, semiconductor elements, chips, integrated circuits, integrated chips, and the like. In some embodiments, circuits 102, 104, 106 and/or 108 may form, or may be implemented as part of, a System on Chip (SoC).

In some demonstrative embodiments, two or more of circuits 102, 104, 106 and/or 108 may be implemented as part of a common integrated circuit (IC) ("chip"). In one example, device 100 may be an IC, a SoC and the like. Accordingly, the wireless communication network between circuits 102, 104, 106 and/or 108 may include an inter-chip network.

In some demonstrative embodiments, circuits 102, 104, 106 and/or 108 may be implemented as part of two or more elements and/or modules, e.g., two or more separate chips. Accordingly, the wireless communication network between electronic circuits 102, 104, 106 and/or 108 may include an intra-chip network.

In some demonstrative embodiments, circuit 102 may include a radio associated with at least one data-handling module 161. For example the radio may include suitable wireless receiver (Rx) 132 and a suitable wireless transmitter (Tx) 134 to receive and transmit wireless communication signals via at least one antenna 112. Data handling module 161 may provide transmitter 134 with data to be transmitted by transmitter 134 and/or may handle data received via receiver 132. Circuit 104 may include a radio associated with at least one data-handling module 162. For example the radio may include a suitable wireless receiver (Rx) 136 and a suitable wireless transmitter (Tx) 138 to receive and transmit wireless communication signals via at least one antenna 114. Data handling module 162 may provide transmitter 138 with data to be transmitted by transmitter 138 and/or may handle data received via receiver 136. Circuit 106 may include a radio associated with at least one data-handling module 163. For example the radio may include a suitable wireless receiver (Rx) 140 and a suitable wireless transmitter (Tx) 142 to receive and transmit wireless communication signals via at least one antenna 116. Data handling module 163 may provide transmitter 142 with data to be transmitted by transmitter 142 and/or may handle data received via receiver 140. Circuit 108 may include a radio associated with at least one data-handling module 164. For example the radio may include a suitable wireless receiver (Rx) 146 and a suitable wireless transmitter (Tx) 148 to receive and transmit wireless communication signals via at least one antenna 118. Data handling module 164 may provide transmitter 148 with data to be transmitted by transmitter 148 and/or may handle data received via receiver 146. Data-handling modules 161, 162, 163 and/or 164 may include, for example, a processor, an application processor, a MAC processor, a memory, and the like.

In some demonstrative embodiments, the radios of electronic circuits 102, 104, 106 and/or 108 may include ultra-wideband (UWB) radios capable of communicating over a UWB wireless communication channel, for example, at low energy levels and/or for short-range high-bandwidth communications by using a large portion of the radio spectrum. For example, the radios of electronic circuits 102, 104, 106 and/or 108 may utilize a frequency bandwidth of at least 500 Megahertz (MHz), e.g., within the range of 3.1 to 10.6 Gigahertz (GHz). In opposed to other radio technologies, which transmit information by varying the power level, frequency, and/or phase of a sinusoidal wave over a carrier frequency, UWB radios may transmit information by generating radio energy at specific time instants and occupying large bandwidth thus enabling a pulse-position or time-modulation.

In some demonstrative embodiments, circuits 102, 104, 106 and/or 108 may be configured to communicate over a common wireless communication channel according to a multiple access algorithm.

In some demonstrative embodiments, circuits 102, 104, 106 and/or 108 may implement a random multiple access algorithm for communicating with one another over the common wireless communication channel, e.g., as described in detail below.

In some demonstrative embodiments, circuits 102, 104, 106 and/or 108 may communicate with one another using pulse-position-modulation (PPM) signals, e.g., as described below. In other embodiments, circuits 102, 104, 106 and/or 108 may communicate with one another using any other suitable signals.

In some demonstrative embodiments, a first circuit ("the transmitter circuit") of circuits 102, 104, 106 and/or 108 may transmit a packet to a second circuit ("the receiver circuit") of circuits 102, 104, 106 and/or 108. The packet may include a predefined number of bits. The first circuit may transmit the packet by transmitting a sequence of a plurality PPM signals representing a respective plurality of bits of the packet.

In some demonstrative embodiments, the sequence of PPM signals may include a respective sequence of signal pulses, which may have for example, very short duration, e.g., in the order of nanoseconds or even hundred picoseconds. In one example, the PPM signals may include Gaussian monocycle pulses having wide bandwidth, e.g., with a target monocycle pulse center frequency of 5 GHz, and the like.

In some demonstrative embodiments, circuits 102, 104, 106 and/or 108 may be synchronized. In one example, circuits 102, 104, 106 and/or 108 may be synchronized to communicate with one another over the common wireless communication channel during a predefined sequence of time slots.

In some demonstrative embodiments, time may be divided into a predefined sequence of frame time slots ("frame slots"). Each frame time slot may include M time slots ("bit slots"), each having a predefined duration, denoted $t_s$. Each circuit of circuits 102, 104, 106 and/or 108 may be allowed to transmit an M-bit packet within a frame slot, e.g. by beginning the packet transmission at the beginning of the frame slot.

In some demonstrative embodiments, the transmitter circuit may transmit a bit of the packet during a respective bit slot of the M bit slots. The transmitter circuit may transmit the bit as a PPM pulse having a predefined pulse duration, denoted $\tau$.

Figure 2:
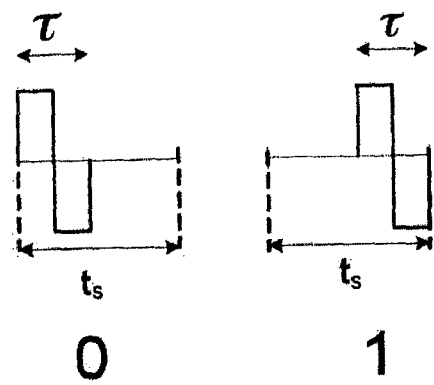
FIG. 2 is a schematic illustration of a time diagram of first and second pulse-position-modulation (PPM) signals representing first and second respective bit values, in accordance with some demonstrative embodiments of the invention.

In some demonstrative embodiments, the transmitter circuit may modulate information of the bit of the packet by positioning the pulse within the bit slot. FIG. 2 schematically illustrates first and second PPM signals representing first and second respective bit values. For example, as shown in FIG. 2, a first bit value, e.g., "Zero", may be modulated by shifting the pulse to a first position, e.g., a left border, of the bit slot; and a second bit value, e.g., "One", may be modulated by shifting the pulse to a second position, e.g., a right border, of the bit slot.

In some demonstrative embodiments, the receiver circuit may demodulate the bit of the packet from the PPM signal by determining the position of the pulse within the corresponding bit slot, e.g., using any suitable demodulation and/or correlation method and/or algorithm.

In some demonstrative embodiments, the receiver circuit may receive during a time slot a PPM signal representing a combination of two or more bit values, e.g., if two or more circuits of circuits 102, 104, 106 and/or 108 transmit signals during a common frame slot, e.g., simultaneously.

Figure 3:
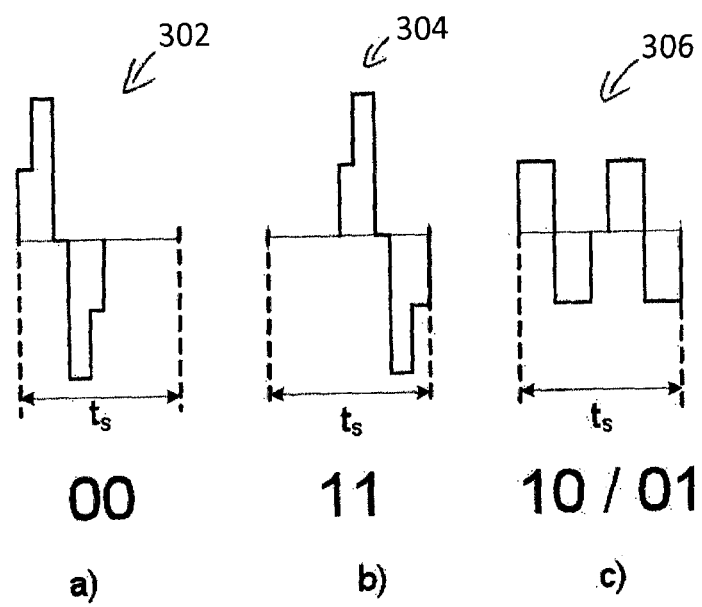
FIG. 3 is a schematic illustration of a time diagram of three received PPM signals corresponding to three respective combinations of first and second transmitted bit values, which are transmitted during a common bit slot, in accordance with some demonstrative embodiments of the invention.

FIG. 3 schematically illustrates three received PPM signals corresponding to three respective combinations of first and second transmitted bit values, which are transmitted during a common bit slot, in accordance with some demonstrative embodiments.

As shown in FIG. 3, in a first example, both the first and second transmitted bits may have the same first value, e.g., "zero". Accordingly, the pulse positions of the first and second transmitted bits may coincide and a resulting first received PPM signal 302 may represent the first bit value, e.g., "zero". According to this example, the receiver circuit may be capable of correctly decoding PPM signal 302 and determining that the first and second transmitted bits have the first value.

As shown in FIG. 3, in a second example, both the first and second transmitted bits may have the same second value, e.g., "one". Accordingly, the pulse positions of the first and second transmitted bits may coincide and a resulting second received PPM signal 304 may represent the second bit value, e.g., "one". According to this example, the receiver circuit may be capable of correctly decoding the signal 304 and determining that the first and second transmitted bits have the second value.

As shown in FIG. 3, in a third example, a "collision" or "conflict" may occur when the first and second transmitted bits may have different values, e.g., "zero" and "one". Accordingly, the superposition of the pulse positions of the first and second transmitted PPM signals may occupy both the left and right slot positions, such that the receiving circuit may receive a third received PPM signal 306 and may not be able to distinguish between the transmitted bits represented by PPM signal 306.

In some demonstrative embodiments, when collision occurs between the PPM signals of two or more packets, the receiving circuit may not be able to successfully decode the two or more packets.

In some demonstrative embodiments, when collision occurs between transmission of at least first and second packets, the receiver circuit may be able to determine the bit values of bits ("detectable bits") of the first and second packets corresponding to received bit slots including the signals 302 or 304, for example, by determining that the detectable bits of both the first and second packets corresponding to the bit slots including signal 302 to have the value "zero", and determining that the detectable bits of both the first and second packets corresponding to the bit slots including signal 304 to have the value "one".

In some demonstrative embodiments, the receiver circuit may not be able to determine the bit values of bits ("undetectable bits") of the first and second packets corresponding to received bit slots including the signal 306. However, the receiver may be able to determine the bit values of the undetectable bits of the first packet, if the bit values of the undetectable bits of the second packet are known, since as explained above, due to the use of the PPM, the undetectable bits are a combination of complementary, i.e., inverse, bit values. Accordingly, it may be enough to retransmit only one of the colliding packets, since, for example, the first packet may be restored based on the second packet.

The term "complementary value" as used herein with respect to a bit value includes a bit value, which opposite to and/or complementary to the bit value, e.g., the complementary value of a bit value may be determining by applying a logical "not" operator to the bit value. For example, "one" is the complementary value of "zero" and "zero" is the complementary value of "one".

In some demonstrative embodiments, the transmitter circuit may be configured to selectively retransmit the packet over the channel during a successive frame time slot, for example, according to a retransmission algorithm, e.g., as described below.

Referring back to FIG. 1, in some demonstrative embodiments, the transmitter circuit of circuits 102, 104, 106 and/or 106 may not be capable of determining whether the transmitted packet has collided with another transmission from another circuit of circuits 102, 104, 106 and/or 106. For example, the transmitter circuit may not be capable simultaneously transmitting and receiving signals over the wireless communication channel. However, in other embodiments, one or more circuits of circuits 102, 104, 106 and/or 106 may be capable of simultaneously transmitting and receiving signals over the channel and, accordingly, such circuit may be capable of detecting a collision event corresponding to a packet transmitted by the circuit.

In some demonstrative embodiments, device 100 may include a channel monitor 110 to monitor the wireless communication channel, and to feedback to circuits 102, 104, 106 and/or 108 a sequence of event feedbacks corresponding to the sequence of frame time slots.

In some demonstrative embodiments, an event feedback corresponding to a frame time slot may indicate whether or not a packet is successfully decodable from a wireless signal received over the channel during the frame time slot, e.g., as described in detail below.

In some demonstrative embodiments, channel monitor 110 may feedback the event feedback to circuits 102, 104, 106 and 108 at the end of each frame.

In some demonstrative embodiments, channel monitor 100 may include a receiver 150 to receive, via at least one antenna 120, the wireless signals transmitted by circuits 102, 104, 106 and/or 108 over the common wireless communication signal. For example, receiver 150 may be similar to receivers 132, 136, 140 and/or 146.

In some demonstrative embodiments, monitor 110 may feedback the event feedbacks to circuits 102, 104, 106 and/or 108 via a respective plurality of feedback links 122, 124, 126 and/or 128. In some embodiments, inks 122, 124, 126 and/or 128 may include wired links. However, in other embodiments, one or more of links 122, 124, 126 and 128 may include wireless links.

In some demonstrative embodiments, channel monitor 110 may monitor the wireless communication channel to detect a wireless signal over the channel during a frame slot. Channel monitor 110 may feedback a first event feedback indication ("empty feedback"), for example, if no wireless signal is detected over the channel during the frame period.

In some demonstrative embodiments, if a wireless signal is detected during the frame period, channel monitor 110 may attempt to decode a packet from the wireless signal, e.g., using any suitable detection, demodulation and/or decoding algorithm. In some demonstrative embodiments, the packet may implement an error detection mechanism, for example, a suitable checksum value, e.g., a CRC-32 mechanism or any other suitable mechanism, to determine whether the received packet includes an error.

In some demonstrative embodiments, channel monitor 110 may feedback a second event feedback indication ("success feedback"), for example, if a packet is successfully decoded from the wireless signal.

In some demonstrative embodiments, channel monitor 110 may feedback a third event feedback indication ("conflict feedback"), for example, if a packet is not successfully decoded from the wireless signal.

In some demonstrative embodiments, channel monitor 110 may include a suitable buffer 191 to buffer data of the wireless signal, for example, if a packet is not successfully decoded from the wireless signal.

In some demonstrative embodiments, buffer 191 may have a size of at least M bits, e.g., to buffer bit values corresponding to the M bit slots of a frame slot, respectively.

In some demonstrative embodiments, channel monitor 110 may store in buffer 191 data of a first wireless signal received over the channel during a first frame slot, for example, if channel monitor 110 cannot successfully decode a first packet from the first wireless signal.

In some demonstrative embodiments, channel monitor 110 may feedback to circuits 102, 104, 106 and/or 108 a first event feedback including the collision feedback indicating that the first wireless signal is not successfully decodable.

In some demonstrative embodiments, the first wireless signal may result from a collision between at least first and second PPM signals transmitted by first and second circuits of circuits 102, 104, 106 and 108 during the first time slot, e.g., as described above with reference to FIG. 3.

In some demonstrative embodiments, channel monitor 110 may receive a second wireless signal over the channel during a second frame slot, successive to the first frame slot. Channel monitor 110 may attempt to decode a second packet from the second wireless signal.

In some demonstrative embodiments, the first and second packets may include first and second different packets transmitted by first and second circuits. The first wireless signal includes a combination of the first and second packets transmitted during the first time slot, and the second wireless signal includes the second packet retransmitted during the second time slot, e.g., as described above.

In some demonstrative embodiments, channel monitor 110 may attempt to restore the first packet based on the data buffered in buffer 191 and the second packet, for example, if the second packet is successfully decodable from the second wireless signal, e.g., as described in detail below.

In some demonstrative embodiments, channel monitor 110 may feedback to plurality of circuits 102, 104, 106 and/or 108 a fourth event feedback indication ("success and restore feedback"), indicating that the first packet is successfully restorable based on the buffered data of buffer 191 and the second wireless signal.

In some demonstrative embodiments, the buffered data of buffer 191 may include a plurality of buffered values corresponding to a plurality of respective bits of the first packet. A bit of the first packet may either have a first predefined value, e.g., "zero", or a second predefined value, e.g., "one". A buffered value corresponding to a respective bit of the first packet may include the first or second predefined bit values, for example, if channel monitor 110 decodes the first or second bit values, respectively, of the bit from the first wireless signal. The buffered value may include a third value, denoted "X", for example, if channel monitor 110 cannot decode the first or second bit values of the bit from the first wireless signal.

In one example, the first frame slot includes five bit slots, and channel monitor 110 may successfully decode first, second, fourth and fifth bit values, e.g., the bit values "1", "0", "1" and "0", corresponding to first, second, fourth and fifth bit slots of the frame slot, while channel monitor 110 may not be able to successfully decode a third value corresponding to a third bit slot of the frame slot. Accordingly, channel monitor 110 may buffer in buffer 191 the sequence "10X10", wherein the notation "X" indicates that the third bit value of the packet may not be decoded.

In some demonstrative embodiments, channel monitor 110 may determine a restored value of the bit of the first packet to include the buffered value corresponding to the bit, e.g., if the buffered value includes either the first or second bit values.

In some demonstrative embodiments, channel monitor 110 may determine the restored value of the bit to include a complimentary value of a respective decoded bit value of a second packet decoded from the second wireless signal, e.g., if the buffered value includes the third value, e.g., the value "X".

In one example, buffer 191 may include the sequence "10X10", channel monitor 110 may decode a second packet to be "10110", and channel monitor 110 may determine the restored first packet to include the sequence "10010".

In some demonstrative embodiments, channel monitor 110 may generate the event feedback including a two-bit value having either a first value representing the first event feedback indication, a second value representing the second event feedback indication, a third value representing the third event feedback indication, or a fourth value representing the fourth event feedback indication. In other embodiments, the event feedback may include any other suitable format, value and/or number of bits.

In some demonstrative embodiments, the transmitter circuit, which transmitted the first packet during the first frame time slot, may selectively retransmit the packet during a successive frame time slot according to at least one retransmission criterion, for example, if the event feedback corresponding to the first frame time slot indicates that the packet is not successfully decodable, e.g., as described in detail below.

In some demonstrative embodiments, the transmitter circuit may randomly select whether or not to retransmit the packet during the successive frame time slot.

In some demonstrative embodiments, the transmitter circuit is to select not to retransmit the packet, for example, if an event feedback corresponding to a second time slot, successive to the first time slot, indicates the packet is restorable, e.g., as described below.

In some demonstrative embodiments, circuits 102, 104, 106 and/or 108 may include buffers 192, 193, 194 and/or 195, respectively, to buffer data of the wireless signal as received by circuits 102, 104, 106 and/or 108 over the wireless communication channel. For example, a receiver circuit of circuits 102, 104, 106 and/or 108 may attempt to decode the first wireless signal and, if the first packet is not successfully decodable from the first wireless signal, the receiver circuit may buffer data of the first wireless signal. The buffered data may be similar, for example, to the data buffered by channel monitor 110. The receiver circuit may restore the first packet based on the buffered data and the second packet, e.g., as described above with reference to the operation of channel monitor 110.

In some demonstrative embodiments, buffers 192, 193, 194 and/or 195 may have a size of at least M bits, e.g., to buffer bit values corresponding to the M bit slots of a frame slot.

In some demonstrative embodiments, if the buffer of a receiver circuit of circuits 102, 104, 106 and/or 108, which successfully receives the second packet, is not empty, then the receiver circuit may attempt to restore the first packet based on the second decoded packet and the buffered data. For example, the receiver circuit may restore the first packet, e.g., as described above with reference to the operation of channel monitor 110. The receiver circuit may determine a checksum value of the restored packet to determine whether or not the restored packet has been correctly restored.

In some demonstrative embodiments, circuits 102, 104, 106 and/or 108 may communicate using PPM signals representing Mbit packets. Each packet may include a source address indicating a transmitter circuit, which transmitted the packet, and a checksum value. Each of buffers 191, 192, 193, 194 and 195 may include M buffer elements. Each buffer element may be set to either a first state, denoted "0", e.g., if a bit corresponding to the buffer element is determined to have the value of zero, a second state, denoted "1", e.g., if the bit corresponding to the buffer element is determined to have the value of one, or a third state, denoted "X", e.g., if a value of the bit corresponding to the buffer element is undetermined, e.g., due to a collision/conflict.

In some demonstrative embodiments, a restore operation, for restoring a first packet based on buffered bit values ("buffer") and a successfully decoded packet ("packet"), may be defined as follows: Restore(packet, buffer)=bits sequence, wherein for each bit:
Restore(0,0)=0
Restore(1,1)=1
Restore(0,X)=1
Restore(1,X)=0

In some demonstrative embodiments, each of circuits 102, 104, 106 and/or 108 may utilize a first value, denoted 1, corresponding to a position in a stack for transmitting a packet, and a second value, denoted k, indicating whether a collision occurred during a previous frame slot, e.g., k=1 if a collision occurred and k=0 otherwise, as described below.

In some demonstrative embodiments, at least one circuit of circuits 102, 104, 106 and/or 108 ("the transmitter circuit") may transmit a packet over the common wireless communication channel.

In some demonstrative embodiments, channel monitor 110 may attempt to receive a PPM signal over the common wireless communication channel during a frame time slot. Channel monitor 110 may attempt to decode a packet from the received PPM signal.

In some demonstrative embodiments, if all bits of the packet are received successfully, channel monitor 110 may set the event feedback to "success". Channel monitor 110 may attempt to restore a previous packet based on the decoded packet and buffered bit values of buffer 191, e.g., if buffer 191 is not empty.

In some demonstrative embodiments, channel monitor 110 may determine whether or not the restored packet was correctly restored, e.g., using the checksum of the restored packet Channel monitor 110 may set the event feedback to "success+restore", e.g., if the restored packet was correctly restored.

In some demonstrative embodiments, channel monitor 110 may set the event feedback to "conflict", e.g., if one or more bits cannot be determined from the received PPM signal. Channel monitor 110 may also buffer data representing the decodable bits and the un-decodable bits, e.g., in buffer 191, for example, as described above.

In some demonstrative embodiments, channel monitor 110 may set the event feedback to "empty", e.g., if no signal is received during the frame slot.

In some demonstrative embodiments, channel monitor 110 may feedback the event, e.g., at the end of the frame time slot.

In some demonstrative embodiments, the transmitter circuit may selectively retransmit the packet during one or more successive frame time slots, for example, based on the event feedback received from channel monitor 110. In one example, the transmitter circuit may selectively retransmit the packet according to the following retransmission algorithm:

```
k=0; l=0
while l ≥ 0
    if l==0
        send the packet
    if conflict
        if l==0
            l = random( {0,1} )
        else
            l = l+1
        k = 1
    else if success + restore
        l = l -2
        k = 0
    else if success
        l = l-1
        if k==1
            if l==0
                l = random( {0,1} )
            else
                l = l+1
        k = 0
    else if empty
        l = l-1
        if k==1
            if l==0
                l = random( {0,1} )
            else
                l = l+1
    end
end
```

In some demonstrative embodiments, at least one circuit of circuits 102, 104, 106 and/or 108 ("the receiver circuit"), e.g., other than the transmitter circuit, may receive the PPM signal during the frame time slot. The receiver circuit may attempt to decode a packet from the received PPM signal.

In some demonstrative embodiments, the receiver circuit may determine whether the source address of the packet corresponds to a circuit, from which the receiver circuit is intended to receive packets, e.g., if all bits of the packet are received successfully. The receiver circuit may further process the packet, e.g., if the source address of the packet does correspond to a circuit, from which the receiver circuit is intended to receive packets.

In some demonstrative embodiments, the receiver circuit may attempt to restore a previous packet based on the decoded packet and buffered bit values stored by the receiver circuit, e.g., if the source address of the packet does not correspond to a circuit, from which the receiver circuit is intended to receive packets.

In some demonstrative embodiments, the receiver circuit may determine whether or not the restored packet was correctly restored, e.g., using the checksum of the restored packet.

In some demonstrative embodiments, the receiver circuit may further process the restored packet, for example, if the restored packet was correctly restored and if a source address of the restored packet does correspond to a circuit, from which the receiver circuit is intended to receive packets.

In some demonstrative embodiments, the receiver circuit may empty the buffer of the receiver circuit, e.g., if the source address of the packet does not correspond to a circuit, from which the receiver circuit is intended to receive packets.

In some demonstrative embodiments, the receiver circuit may buffer data representing the decodable bits and the un-decodable bits, for example, as described above.

In one example, device 100 may include six circuits, denoted, "A", "B", "C", "D", "E" and "F".

Figure 4:
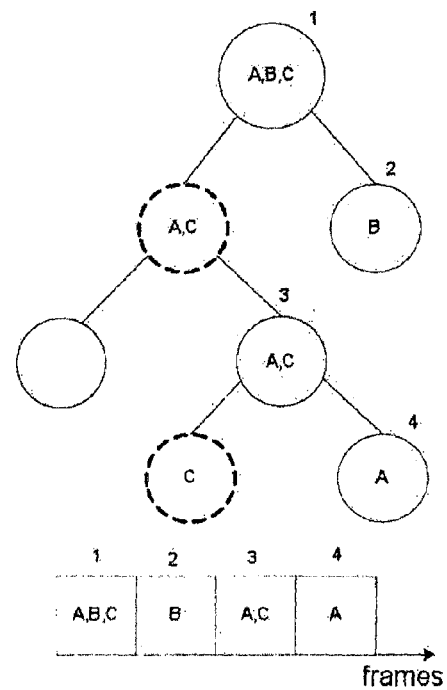
FIG. 4 is a schematic illustration of a packet transmission flow tree, in accordance with a demonstrative embodiment of the invention.

FIG. 4 schematically illustrates a packet transmission flow tree, in accordance with a demonstrative embodiment. A solid node in FIG. 4 indicates a time slot during which one or more circuits select to transmit a wireless transmission, and a dashed node indicates a time slot during which one or more circuits select not to transmit.

As shown in FIG. 4, during a first time slot, circuits A, B and C may select to transmit a packet, e.g., simultaneously. For example, circuit A may transmit a first packet, e.g., to circuit D, circuit B may transmit a second packet, e.g., to circuit E, and circuit C may transmit a third packet, e.g., to circuit F. A channel monitor, e.g., channel monitor 110 (FIG. 1), may detect a collision between the transmissions of the three packets during the first time slot, may buffer the received data, and may feedback to circuits A, B, C, D, E and F an event feedback indicating a collision.

As also shown in FIG. 4, during a second time slot, circuit B may select to retransmit the second packet, while circuits A and C may select not to retransmit the first and second packets, respectively. The channel monitor, e.g., channel monitor 110 (FIG. 1), may be capable of successfully decoding the second packet, and may feedback to circuits A, B, C, D, E and F an event feedback indicating a successful decoding.

As further shown in FIG. 4, during a third time slot, both circuits A and C may select to retransmit the first and second packets, respectively. The channel monitor, e.g., channel monitor 110 (FIG. 1), may be detect a collision between the retransmissions of the two packets during the third time slot, may buffer the received data, and may feedback to circuits A, B, C, D, E and F an event feedback indicating a collision.

As further shown in FIG. 4, during a fourth time slot, circuit A may select to retransmit the first packet, while circuit C may select not to retransmit the third packet. The channel monitor, e.g., channel monitor 110 (FIG. 1), may be capable of successfully decoding the first packet. The channel monitor may also successfully decode the third packet based on the buffered data and the decoded first packet. Accordingly, the channel monitor may feedback to circuits A, B, C, D, E and F an event feedback indicating a successful decoding and restoration. Circuit C may receive the event feedback indicating a successful decoding and restoration, and accordingly, circuit C may select not to retransmit the third packet.

The following table describes the operations performed by circuits A, B, C, D, E and F during the four time slots, with respect to the four first bits of the packets. The notation "?" indicates an undetermined bit value.

| A | B | C | D | E | F | Monitor |
|---|---|---|---|---|---|---|
| 1 k = 0;<br>l = 0<br>Transmit<br>1011 . . . | k = 0;<br>l = 0<br>Transmit<br>1101 . . . | k = 0;<br>l = 0<br>Transmit<br>1000 . . . | Receive<br>1??? . . .<br>buffer: =1XXX . . .<br><br>feedback wire | Receive<br>1??? . . .<br>buffer: =1XXX . . . | Receive<br>1??? . . .<br>buffer: =1XXX . . . | Receive<br>1??? . . .<br>buffer: =1XXX . . .<br>conflict |
| 2 rand({0,<br>1}) == 1<br>l: =1<br>k: =1; | rand({0,<br>1}) == 0<br>l: =0<br>k: =1;<br>Transmit<br>1101 . . . | rand({0,<br>1}) == 1<br>l: =1<br>k: =1; | Receive<br>1101 . . .<br>Restore<br>(1101 . . .<br>1XXX . . .) ==<br>1010.<br>. . .<br>buffer: =empty<br><br>feedback wire | Receive<br>1101 . . .<br>Packet B<br>received. | Receive<br>1101 . . .<br>Restore<br>(1101 . . .<br>1XXX . . .) ==<br>1010.<br>. . .<br>buffer: =empty | Receive<br>1101 . . .<br>Restore<br>(1101 . . .<br>1XXX . . .) ==<br>1010 . . .<br>CheckSum<br>(1000 . . .) ==<br>incorrect<br>buffer: =empty<br>success |
| 3 l: =l − 1 == 0<br>rand({0,<br>1}) == 0<br>l: =0<br>k: =0<br>Transmit<br>1011 . . . | l: =l − 1 ==<br>−1<br>Stop<br>transmitting | l: =l − 1 == 0<br>rand({0,<br>1}) == 0<br>l: =0<br>k: =0<br>Transmit<br>1000 . . . | Receive<br>10?? . . .<br>buffer: =10XX . . .<br><br>feedback wire | | Receive<br>10?? . . .<br>buffer: =10XX . . . | Receive<br>10?? . . .<br>buffer: =10XX . . .<br>conflict |
| 4 rand({0,<br>1}) == 0<br>l: =0<br>k: =0<br>Transmit<br>1011 . . . | | rand({0,<br>1}) == 1<br>l: =1<br>k: =0 | Receive<br>1011 . . .<br>Packet A<br>received.<br><br><br><br><br>feedback wire | | Receive<br>1011 . . .<br>Restore<br>(1011 . . .<br>10XX . . .) ==<br>1000.<br>. . .Packet C<br>restored | Receive<br>1011 . . .<br>Restore<br>(1011 . . .<br>10XX . . .) ==<br>1000 . . .<br>CheckSum<br>(1000 . . .) ==<br>correct<br>buffer: =empty<br>success + restore |
| 5 l: =l − 2 ==<br>−2<br>Stop<br>transmitting | | l: =l − 2 ==<br>−1<br>Stop<br>transmitting | <br>feedback wire | | | Receive<br>empty<br><br>empty |

As shown in the above Table, only four frame time slots may be required for communicating the three packets between circuits A, B, C, D, E and F.

Figure 5:
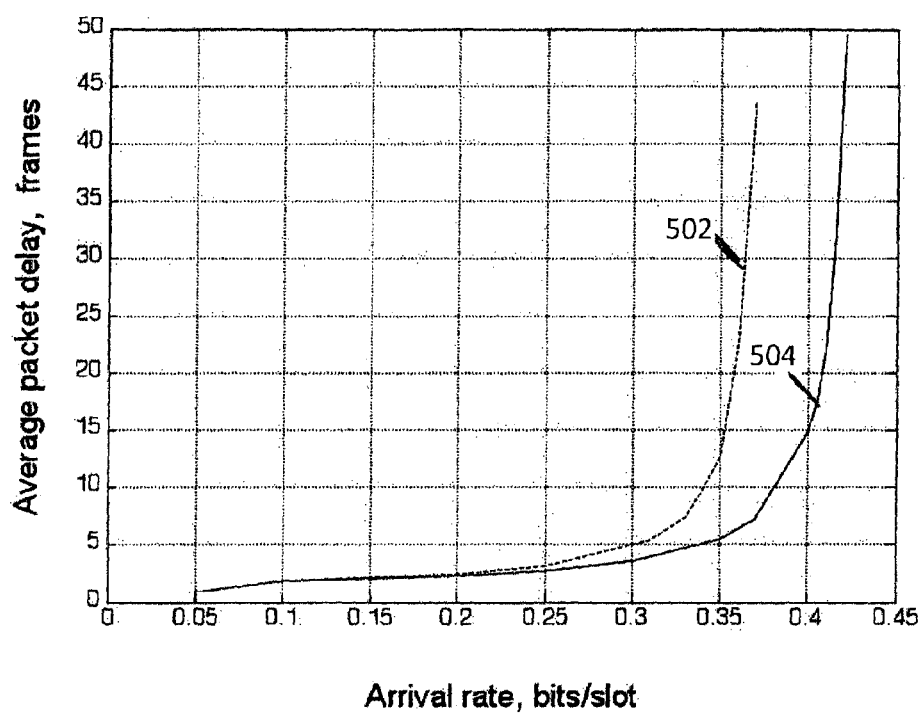
FIG. 5 is a schematic illustration of first and second graphs depicting first and second respective average packet delays versus arrival rate, in accordance with some demonstrative embodiments of the invention.

FIG. 5 schematically illustrates first and second graphs 502 and 504 depicting first and second respective average packet delays, in terms of frame time slots, arrival rate, in terms of bits per slot, in accordance with some demonstrative embodiments. Graph 502 corresponds to a conventional retransmission algorithm, and graph 504 corresponds to the retransmission algorithm described above. Advantageously, as shown in FIG. 5, the retransmission algorithm, in accordance with some embodiments described herein, may achieve a delay gain, e.g., at average arrival rate greater than 0.3 bits per slot.

Figure 6:
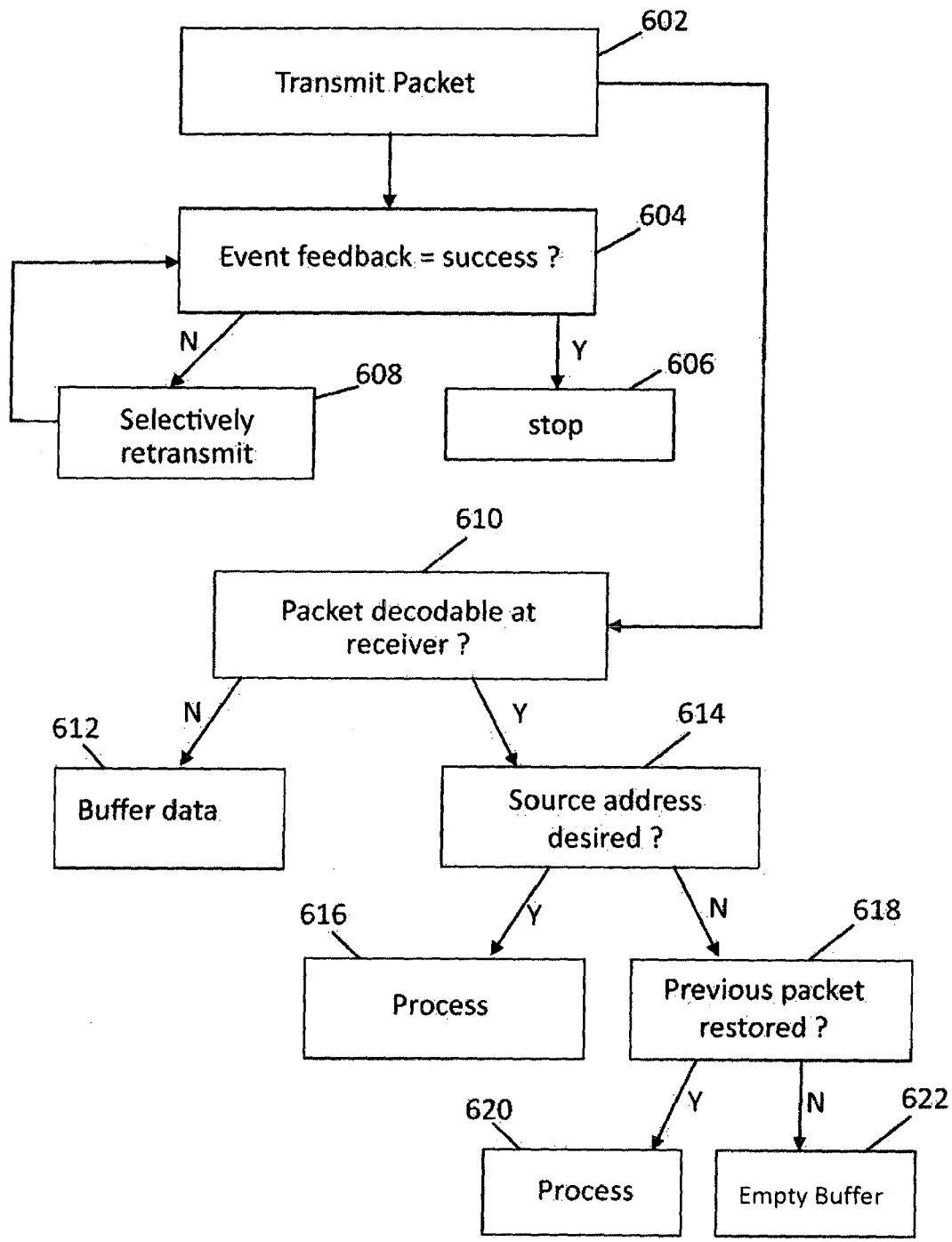
FIG. 6 is a schematic flow-chart illustration of a method of wireless communication between circuits, in accordance with some demonstrative embodiments of the invention.

Reference is made to FIG. 6, which schematically illustrates a method of wireless communication between circuits, in accordance with some demonstrative embodiments. In some embodiments, one or more operations of the method of FIG. 6 may be performed by one or more elements of a device, e.g., device 100 (FIG. 1).

As indicated at block 602, the method may include transmitting a wireless signal representing a packet from a first circuit of a device to a second circuit of the device over a wireless communication channel during a time slot. For example, circuit 102 (FIG. 1) may transmit a first packet to circuit 104 (FIG. 1) during a first frame time slot, e.g., as described above.

As indicated at block 604, the method may include receiving at the first circuit an event feedback corresponding to the time slot, the event feedback indicating whether or not the packet is successfully decodable from the wireless signal received over the channel during the time slot. For example, circuit 102 (FIG. 1) may receive from channel monitor 110 (FIG. 1) an event feedback indicating whether the first packet is decodable, e.g., as described above.

As indicated at block 608, the method may include selectively retransmitting, based on the event feedback, the packet from the first circuit over the channel during a successive time slot. For example, circuit 102 (FIG. 1) may selectively retransmit the first packet, for example, according to a retransmission algorithm, e.g., as described above.

As indicated at block 606, the method may include not retransmitting the packet, for example, if the event feedback indicates that the packet is decodable.

In some demonstrative embodiments, the selectively retransmitting may include randomly selecting whether or not to retransmit the packet during the successive time slot, for example, if the event feedback indicates that the packet is not successfully decodable, e.g., as described above.

In some demonstrative embodiments, transmitting the wireless signal may include transmitting the wireless signal during a first time slot, and selectively retransmitting the packet may include selecting not to retransmit the packet if an event feedback corresponding to a second time slot indicates that the first packet is restorable, e.g., as described above.

In some demonstrative embodiments, the method may include randomly selecting whether or not to retransmit the packet during a third time slot successive to the second time slot, for example, if the event feedback corresponding to the second time slot does not indicate that the first packet is restorable.

As indicated at block 610, the method may include receiving the wireless transmission at the second circuit and attempting to decode the packet from the wireless transmission.

As indicated at block 612, the method may include buffering data of the wireless signal at the second circuit, for example, if the packet is not decodable from the wireless signal, e.g., as described above.

As indicated at block 614, the method may include determining whether the source address of the packet corresponds to a circuit, from which the second circuit is intended to receive packets, for example, if all bits of the packet are received successfully, e.g., as described above.

As indicated at block 616, the method may include processing the packet by the second circuit, for example, if the source address of the packet does correspond to a circuit, from which the second circuit is intended to receive packets, e.g., as described above.

In some demonstrative embodiments, the method may include decoding the packet based on buffered data and another wireless signal received from a third circuit of the device.

As indicated at block 618, the method may include attempting to restore a previous packet based on the decoded packet and buffered bit values stored by the second circuit, for example, if the source address of the packet does not correspond to a circuit, from which the second circuit is intended to receive packets, e.g., as described above.

As indicated at block 620, the method may include processing the restored packet, for example, if the restored packet was correctly restored and if a source address of the restored packet does correspond to a circuit, from which the second circuit is intended to receive packets, e.g., as described above.

As indicated at block 622, the method may include emptying the buffer of the second circuit, for example, if the source address of the packet does not correspond to a circuit, from which the second circuit is intended to receive packets, e.g., as described above.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An integrated chip comprising:
    a plurality of wirelessly interconnected electronic circuits to communicate wireless pulse-position-modulation (PPM) signals over a common ultra-wideband (UWB) wireless communication channel during a predefined sequence of time slots; and
    a monitor circuit connected to said plurality of electronic circuits via a plurality of wired feedback links, said monitor circuit is to monitor said wireless channel, and to feedback via said feedback links a sequence of event feedbacks corresponding to said sequence of time slots, wherein, if said monitor circuit cannot decode a first packet from a first wireless PPM signal during a first time slot, then said monitor circuit is to buffer data of said first wireless PPM signal, to feedback over said feedback links a first event feedback indicating said first wireless PPM signal is not decodable, to receive a second wireless PPM signal during a second time slot, and, if a second packet is successfully decodable from the second wireless signal, to feedback over said feedback links a second event feedback indicating whether the first packet is successfully restorable based on the buffered data and the second wireless signal.

2. The integrated chip of claim 1, wherein said first and second packets comprise first and second different packets transmitted by first and second circuits, wherein said first wireless PPM signal includes a combination of the first and second packets transmitted during the first time slot, and wherein said second wireless signal includes said second packet retransmitted during said second time slot.

3. The integrated chip of claim 1, wherein a circuit of said electronic circuits is to transmit said first packet during said first time slot and to selectively retransmit said packet during said second time slot according to at least one retransmission criterion.

4. The integrated chip of claim 3, wherein said circuit is to randomly select whether or not to retransmit said packet during said second time slot.

5. The integrated chip of claim 3, wherein said circuit is to select not to retransmit said packet during a third time slot if said second event feedback indicates that said first packet is restorable.

6. The integrated chip of claim 1, wherein an electronic circuit of said plurality of electronic circuits is to buffer a plurality of buffered values corresponding to a plurality of respective bits of said first packet,
    and wherein a buffered value corresponding to a respective bit of said first packet includes first or second predefined bit values, if said monitor circuit decodes said first or second bit values, respectively, of said bit from said first wireless PPM signal, and said buffered value includes a third value, if said electronic circuit cannot decode said first or second bit values of said bit from said first wireless signal.

7. The integrated chip of claim 6, wherein said electronic circuit is to determine a restored value of said bit of said first packet to include the buffered value corresponding to said bit, if said buffered value includes either said first or second bit values, and to determine said restored value of said bit to include a complimentary value of a respective decoded bit value of said second packet, if said buffered value includes said third value.

8. The integrated chip of claim 1, wherein said first wireless PPM signal represents a combination of said first packet and at least said second packet.

9. An apparatus comprising:
    a plurality of wirelessly interconnected electronic circuits to communicate with one another over a common wireless communication channel during a predefined sequence of time slots; and
    a monitor circuit connected to said plurality of electronic circuits via a plurality of wired feedback links, said monitor circuit is to monitor said wireless channel, and to feedback via said feedback links a sequence of event feedbacks corresponding to said sequence of time slots, wherein an event feedback corresponding to a time slot indicates whether or not a packet is successfully decodable from a wireless signal received over said channel during said time slot,
    wherein an electronic circuit of said plurality of electronic circuits is to transmit said packet during said time slot and, if said event feedback indicates that said packet is not successfully decodable from said wireless signal, to selectively retransmit said packet during a successive time slot according to at least one retransmission criterion.

10. The apparatus of claim 9, wherein, if a first packet is not successfully decodable from a first wireless signal received over said channel during a first time slot, then said channel monitor is to buffer data of said first wireless signal, to feedback to said plurality of electronic circuits a first event feedback indicating said first wireless signal is not successfully decodable, to receive a second wireless signal over said channel during a second time slot, and, if a second packet is successfully decodable from the second wireless signal, to feedback to said plurality of electronic circuits a second event feedback indicating whether the first packet is successfully restorable based on the buffered data and the second wireless signal.

11. The apparatus of claim 10, wherein another electronic circuit of said plurality of electronic circuits is to receive said first wireless signal, to buffer the data of said first wireless signal, and to restore said first packet based on the buffered data and said second wireless signal.

12. The apparatus of claim 11, wherein said another electronic circuit is to buffer a plurality of buffered values corresponding to a plurality of respective bits of said first packet, and wherein a buffered value corresponding to a respective bit of said first packet includes first or second predefined bit values, if said another electronic circuit decodes said first or second bit values, respectively, of said bit from said first wireless signal, and said buffered value includes a third value, if said other circuit cannot decode said first or second bit values of said bit from said first wireless signal.

13. The apparatus of claim 12, wherein said another electronic circuit is to determine a restored value of said bit of said first packet to include the buffered value corresponding to said bit, if said buffered value includes either said first or second bit values, and to determine said restored value of said bit to include a complimentary value of a respective decoded bit value of a second packet decoded from the second wireless signal, if said buffered value includes said third value.

14. The apparatus of claim 9, wherein said electronic circuit is to randomly select whether or not to retransmit said packet during said successive time slot.

15. The apparatus of claim 9, wherein said wireless communication channel includes an ultra-wideband (UWB) channel, wherein said wireless signal includes a pulse-position-modulation (PPM) signal, and wherein said packet includes a predefined number of bits.

16. A method comprising:
transmitting a wireless signal representing a packet from a first electronic circuit of a device to a second electronic circuit of said device over a wireless communication channel during a first time slot;
receiving from a monitor circuit of said device an event feedback corresponding to said first time slot, said event feedback indicates whether or not said packet is successfully decodable from the wireless signal; and
based on said event feedback, selectively retransmitting said packet from said first electronic circuit over said channel during a successive time slot, said selectively retransmitting said packet comprising:
selecting not to retransmit said packet if an event feedback corresponding to a second time slot indicates that said packet is restorable; and
if the event feedback corresponding to said second time slot does not indicate that said packet is restorable, randomly selecting whether or not to retransmit said packet during a third time slot successive to said second time slot.

17. The method of claim 16, wherein if said event feedback indicates that said packet is not successfully decodable, said selectively retransmitting includes randomly selecting whether or not to retransmit said packet during said successive time slot.

18. The method of claim 16 comprising:
receiving said wireless signal at said second electronic circuit; and
if said packet is not successfully decodable from said wireless signal, buffering data of said wireless signal at said second electronic circuit.

* * * * *